3,342,543
GLUTARALDEHYDE STABILIZED WOOL

William F. Happich, Jenkintown, Wallace Windus, Meadowbrook, and Joseph Naghski, Wyndmoor, Pa., assignors to the United States of America as represented by the Secretary of Agriculture
No Drawing. Filed Nov. 4, 1964, Ser. No. 409,029
3 Claims. (Cl. 8—128)

A non-exclusive, irrevocable, royalty-free license in the invention herein described, throughout the world for all purposes of the United States Government, with the power to grant sublicenses for such purposes, is hereby granted to the Government of the United States of America.

This invention relates to the chemical modification of wool. More particularly this invention relates to the reaction of glutaraldehyde with wool and has among its objects the preparation of a wool product of markedly enhanced chemical stability, especially in the presence of alkali.

Many items prepared from wool have a limited period of useful service because of deleterious effect of various chemicals to which the items are subjected. The alkaline nature of many laundering agents is a factor in causing shrinkage of woolen goods during washing. The felt pads commonly used in papermaking machines require frequent replacement because of poor resistance, both to chemicals and to bacteria. Hence, means of improving the stability of wool is important in maintaining current uses and in developing new uses for wool.

A current, successfully employed method for increasing stability of wool is to apply in consecutive treatments materials which will undergo interfacial polymerization to form a coating on the surface of the woolen fiber. Attempts to stabilize wool by chemical reactions at the disulfide linkages are considerably older in the art. The disulfide bonds are disrupted, as with a reducing agent, and the thiol groups reacted with alkylating agents or with imides of unsaturated dibasic acids to form a modified woolen product.

The process of the present invention is markedly different from the foregoing processes. We have discovered that glutaraldehyde chemically combines with wool keratin to produce extremely stable cross linkages. The process is not considered to disrupt the disulfide linkages, yet the glutaraldehyde, apparently because of its small-sized molecules, penetrates completely through the wool fibers. Under controlled conditions of pH glutaraldehyde combines rapidly with uptakes of as much as about 4% based on dry weight of the wool.

The glutaraldehyde modified wool has, quite unexpectedly, a remarkable resistance to breakdown by sodium sulfide. Yet despite the chemical stabilization by the present process and the high degree of incorporation of glutaraldehyde into the wool fiber, the porosity of the fiber is not decreased. The glutaraldehyde modified wool has a golden yellow color which probably poses a limitation for use in garments, but for uses where color is not a primary consideration the retention of desirable physical characteristics of natural wool plus the greatly enhanced chemical stability resulting from the process of the present invention provides an improved wool product, especially wool products for industrial uses.

According to the present invention a wool of enhanced stability is obtained by a process comprising impregnating wool with an aqueous solution of glutaraldehyde at a pH in the range of about 4 to 9 until reaction of glutaraldehyde with wool is substantially complete.

Progress of the reaction is readily followed by visual inspection to ascertain the development of a characteristic yellow color. Chemical analyses were used to substantiate visual control and to quantitatively determine the uptake of glutaraldehyde from the solution upon reaction with the wool.

While the process is typically conducted at ambient or slightly higher temperatures, satisfactory results may be obtained over a wide range of temperature, the reaction proceeding more slowly in cold water and more rapidly when the water is heated.

The process may be conducted over a wide range of pH, such as about pH 4 to 9, although the reaction proceeds very slowly under acidic conditions.

In a preferred embodiment of the process the wool is impregnated with an aqueous solution of glutaraldehyde at about pH 4 to 4.5 and then the pH is progressively adjusted to alkaline conditions to speed up the reaction and assure optimum chemical modification of the wool.

Within the float range employed commercially the concentration of glutaraldehyde in solution may be varied widely with successful results, but it is important that the amount of glutaraldehyde present be sufficient to provide adequate uptake of glutaraldehyde by the wool. In Example 1, analyses of initial and final solutions showed an uptake of 64% of the glutaraldehyde present. Thus, an uptake of 1.7%, based on wet weight of wool, of the 2.5% present in the solution, gave excellent results.

Examples are presented to illustrate the practice of the invention, but are not intended to be in limitation thereof. The glutaraldehyde used in the examples was a commercial product supplied as a stable 25% solution.

Example 1

The following solution was prepared in a churn: water, 20,490 gms.; anhydrous sodium sulfate, 615 gms.; sodium formate, 62 gms.; and glutaraldehyde, 50.1 gms. (201 gms. of 25% solution). The churn was steamed for 5 minutes, raising the temperature of the solution to 35° C. The wool to be processed was obtained from a shearling, and had been scoured, acidified and washed. Wet wool, 2049 gms. (57.8% water) was added to the churn, the churn closed and turned for 1 minute, then allowed to stand with the wool immersed in the solution for 30 minutes. Temperature was 32° C. and pH 4.7. Turning and standing was repeated; pH now 4.8. Sodium carbonate, 21 gms. was added and the turning and standing repeated. Temperature remained 32° C. and pH was 8.9. One hour later (after turning for 1 minute at the half hour) pH was 7.1 and 2.1 gms. sodium carbonate was added. Thirty minutes later 4.2 gms. sodium carbonate was added. Temperature was 30° C. One hour later the temperature was the same and pH 7.5. Sodium carbonate, 4.2 gms. was added. Thirty minutes later the pH was 8.5. During the next three hours, two additions of 2.1 gms. sodium carbonate were made, the pH ranging from 7.9 to 8.3. After standing overnight the temperature was 30° C. and pH 7.5. The wool was taken from the churn, squeezed by hand to remove solution, washed twice in water and air dried at room temperature.

A modification of the ASTM Standard Method of Test for Alkali-Solubility of Wool (D1283–57) was used to determine the sodium sulfide solubility of the product of Example 1 and, as a control, similar wool which was not treated with glutaraldehyde.

The wool samples were extracted with carbon tetrachloride and air dried. One gram portions, dried to constant weight at 105° C., were immersed for exactly one hour in 100 ml. of 1% and 3% $Na_2S \cdot 9H_2O$ solutions in a constant temperature bath at 65±0.05° C. The test portions were washed, then dried to constant weight at 105° C. The test results are presented in Table I.

TABLE I.—PERCENT SOLUBILITY OF WOOL IN SODIUM SULFIDE SOLUTIONS, ONE HOUR AT 65° C.

| $Na_2S \cdot 9H_2O$ concentration | 1% | 3% |
|---|---|---|
| pH | 12.4 | 12.6 |
| Unmodified control | 62 | 89 |
| Glutaraldehyde modified wool | 5 | 22 |

In a similar manner (ASTM Method D1283-57) wool samples were tested for solubility in sodium hydroxide solution. Only 7% of the glutaraldehyde modified wool sample dissolved in one hour in sodium hydroxide solution at pH 12.6 and 65° C. as compared with 15% of the unmodified control.

*Example 2*

White wool cloth was cut into two sections. One section was used in a procedure substantially as described in Example 1 to give a glutaraldehyde modified wool cloth. The air-dried weight increase was 4.2% with an area loss of approximately 15%. The other section of cloth was placed in a churn with distilled water and agitated and allowed to stand in the same sequence as the cloth in glutaraldehyde solution. The cloth from the distilled water agitation also had an area loss of approximately 15%, demonstrating that the chemical modification with glutaraldehyde does not cause any additional shrinkage.

Four-inch square pieces of the glutaraldehyde modified cloth of Example 2 and the unmodified control from the distilled water agitation were washed in a "Launder-Ometer" for three 15 minute cycles at 140° F., using 0.5% mild soap solution having a pH about 10. Area loss for the glutaraldehyde modified cloth was only 3%, while the cloth previously agitated in distilled water had an area loss of 9%.

The enhanced stability of the products of Examples 1 and 2 demonstrate the benefits of the glutaraldehyde modification of wool and provide materials with greater commercial utility.

The following example is presented to illustrate the preparation of improved shearling bed pads.

*Example 3*

In a stainless steel lined drum were combined: water, 146,820 gms.; anhydrous sodium sulfate, 5405 gms.; sodium formate, 441 gms., and glutaraldehyde, 1468 gms. of 25% solution. The drum was steamed 10 minutes to bring the glutaraldehyde solution to 35° C. Six pickled shearlings, 14,682 gms., were placed in the drum, the drum closed, and the drum turned at 12 r.p.m. The sequence described in Example 1 was used; running 1 minute, then standing 29 minutes. After 1 hour the temperature was 31° C., pH 4.0. Sodium carbonate, 294 gms., was added. After 1 hour the pH was 6.2 and 147 gms. sodium carbonate was added. One hour later the pH was 6.8; 147 gms. sodium carbonate was added, giving a pH one hour later of 7.6. One more increment of sodium carbonate was added so that after an hour the pH was 8.6. Turning and standing with the skins immersed was continued for two hours, then the drum allowed to stand overnight. Temperature was 25° C., pH 7.7. Shrink temperatures of samples from the neck area of the six skins were 83, 84, 85, 85, 87 and 87° C. The skins were washed with two changes of water and acidified in about 0.2% sulfuric acid solution to give a skin pH about 4.0. The skins were washed once more, treated with a fat-liquoring preparation and horsed.

Shearlings prepared as in Example 3 have improved resistance to deterioration from washing over typical commercially prepared shearlings. The glutaradehyde modified wool on the shearlings retains its ability to absorb water and perspiration, and shearlings prepared according to the present invention have been successfully test-used by bed patients in hospitals.

We claim:
1. A method for preparing wool of enhanced stability comprising impregnating wool with an aqueous solution of glutaraldehyde at a pH in the range of about 4 to 9 until reaction of glutaraldehyde with wool is substantially complete.
2. The process of claim 1 in which the glutaraldehyde in the aqueous solution is at a level of about 2.5% glutaraldehyde, based on wet weight of wool.
3. A method for preparing wool of enhanced stability comprising impregnating wool with an aqueous solution of glutaraldehyde at a pH in the range of about 4 to 4.5, adjusting the pH of the solution above pH 7, and maintaining the solution at a pH in the range of about 7.5 to 9 until reaction of glutaraldehyde with wool is substantially complete.

References Cited

UNITED STATES PATENTS

| 2,441,859 | 5/1948 | Weisberg et al. | 8—128 X |
| 2,519,978 | 8/1950 | Press | 8—127.6 |
| 2,886,399 | 5/1959 | Pasternak | 8—128 X |
| 2,941,859 | 6/1960 | Fein et al. | 8—94.33 |
| 2,971,814 | 2/1961 | Seligsberger | 8—94.33 |

FOREIGN PATENTS 825,544  12/1959  Great Britain.

OTHER REFERENCES

Filachione et al., The Leather Manufacturer, 6 pages, February 1964.

Happich et al., JALCA, vol. 59, No. 8, pp. 448–461, August 1964.

NORMAN G. TORCHIN, *Primary Examiner.*

J. C. CANNON, *Assistant Examiner.*